United States Patent
Lai et al.

(10) Patent No.: US 7,116,225 B2
(45) Date of Patent: Oct. 3, 2006

(54) STRUCTURE FOR PREVENTING LOSS OF PEN FOR ELECTRONIC DEVICES

(75) Inventors: Cheng-Shing Lai, Taipei Hsien (TW); Hao-Liang Zhou, Nanking (CN)

(73) Assignee: Inventec Appliances Corporation, Taipei Hsien (TW)

( * ) Notice: Subject to any disclaimer, the term of this patent is extended or adjusted under 35 U.S.C. 154(b) by 208 days.

(21) Appl. No.: 10/859,192

(22) Filed: Jun. 3, 2004

(65) Prior Publication Data

US 2005/0270167 A1 Dec. 8, 2005

(51) Int. Cl.
*G08B 13/14* (2006.01)

(52) U.S. Cl. .............................. 340/568.1; 340/686.1; 340/687; 340/686.4

(58) Field of Classification Search ............ 340/568.1, 340/686.1, 687, 686.4, 568.7, 568.4
See application file for complete search history.

(56) References Cited

U.S. PATENT DOCUMENTS

| 4,870,405 | A | * | 9/1989 | Fletcher ................... 340/568.1 |
| 5,614,886 | A | * | 3/1997 | Snell et al. ................ 340/571 |
| 5,625,606 | A | * | 4/1997 | Openiano .................... 368/10 |
| 5,635,959 | A | * | 6/1997 | Takeuchi et al. ............ 345/179 |
| 6,114,958 | A | * | 9/2000 | Murphy ..................... 340/568.1 |

* cited by examiner

*Primary Examiner*—Daryl C Pope
(74) *Attorney, Agent, or Firm*—Bacon & Thomas

(57) ABSTRACT

The present invention discloses a structure for preventing the loss of a pen of an electronic device comprising a pen holding slot, a sensor switch disposed in the pen holding slot, and a control circuit being electrically connected to the sensor switch, so that if the pen is not placed into the pen hold slot, the sensor switch will send a non-press signal to the control circuit, enabling the control circuit to turn on a beeping circuit to generate a warning sound to remind users to place the pen back into the pen holding slot. Therefore, the present invention can prevent the loss of the pen by the reminder of such warning sound.

1 Claim, 2 Drawing Sheets

STRUCTURE FOR PREVENTING LOSS OF PEN FOR ELECTRONIC DEVICES

FIELD OF THE INVENTION

The present invention relates to a structure for preventing the loss of a pen of an electronic device, especially referring to an electronic device comprising a pen holding slot and a sensor switch disposed in the pen holding slot, such that if the pen is not placed into the pen holding slot, the sensor switch will send a non-press signal to a control circuit, enabling the control circuit to turn on a beeping circuit to generate a warning sound to remind users to put the pen back into the pen holding slot.

BACKGROUND OF THE INVENTION

Since a portable electronic device such as a personal digital assistant (PDA) usually comes with a touch screen to let users enter text and graphics, or select a software option of the electronic device on the touch screen by using a pen. Thus, the pen is used as a mouse.

In general, PDA manufacturers adopt a special material to make such pen in order to protect the screen better. Therefore, any input via the screen is limited to a particular pen only. If a user uses another pen for the input, it will damage the screen (such as a scrape on the surface). Sin the pen is used very often, it is easy to forget to put the pen back into the pen holding slot, and thus the user may lose the pen very easily, and it also creates a problem of being unable to input data or instructions without the pen to the user. The way of solving the problem of easily losing the pen and designing a structure for preventing the loss of the pen are urgent subjects for the electronic industry.

SUMMARY OF THE INVENTION

In view of the foregoing shortcoming of losing the pen easily, the inventor of this invention based on years of experience on the production and design of electronic devices to conduct researches and experiments to overcome the foregoing shortcoming and look for a feasible solution, and finally invented the structure for prevent the loss of a pen for electronic devices in accordance with the present invention.

The primary objective of the present invention is to provide a structure comprising a pen holding slot installed on the electronic device, and a sensor switch disposed in the pen holding slot and electrically connected to a control circuit, such that if the pen is placed into the pen holding slot, the pen will press on the sensor switch and a press signal will be sent from the sensor switch to the control circuit; if the pen is not placed into the pen holding slot, the pen will not press on the sensor switch and a non-press signal will be sent from the sensor switch to the control circuit. As long as the electronic device is turned off or has not been used for a while or the sensor switch keeps sending the non-press signal to the control circuit, the control circuit will turn on a beeping circuit to generate a warning sound to remind users to put the pen back into the pen holding slot. With the reminder of such warning sound, the present invention can achieve the objective of preventing the loss of the pen.

Another objective of the present invention is to provide a structure for preventing the loss of a pen of an electronic device comprising a switch disposed between the control circuit and the sensor switch, so that when a user presses the switch for an electric connection or disconnection, the sensor switch is turned on or off respectively. In other words, users can use the switch to turn on or off the sensor switch.

The above and other objects, features and advantages of the present invention will become apparent from the following detailed description taken with the accompanying drawings.

DETAILED DESCRIPTION OF THE PREFERRED EMBODIMENTS

For ease in understanding the objective of the invention, its structure, innovative features, and performance, we use a preferred embodiment together with the attached drawings for the detailed description of the invention.

Figure 2:
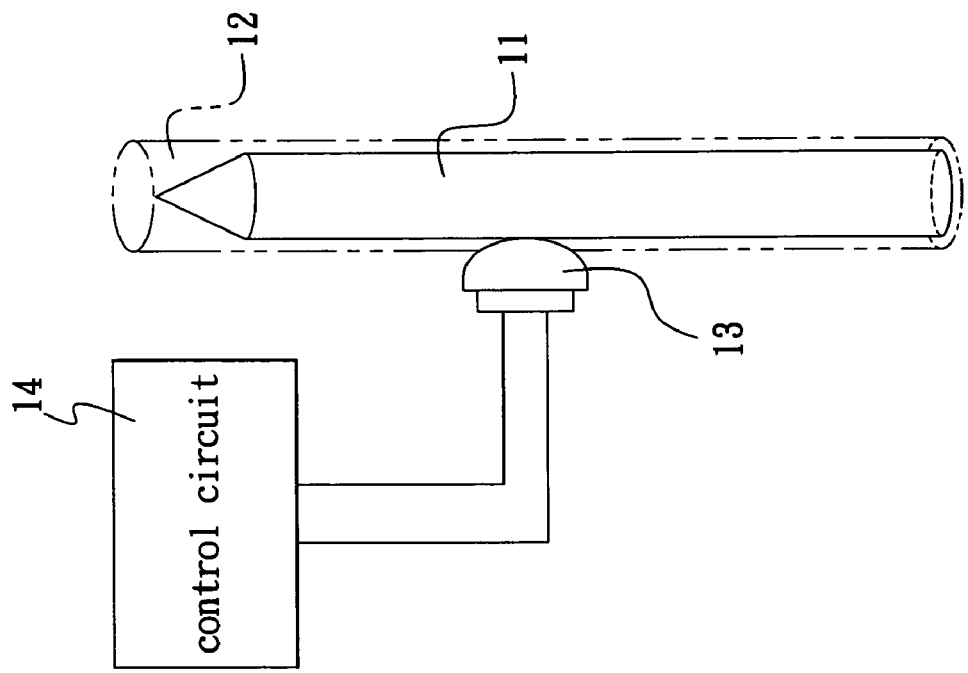
FIG. 2 is another block diagram of the present invention.
Figure 1:
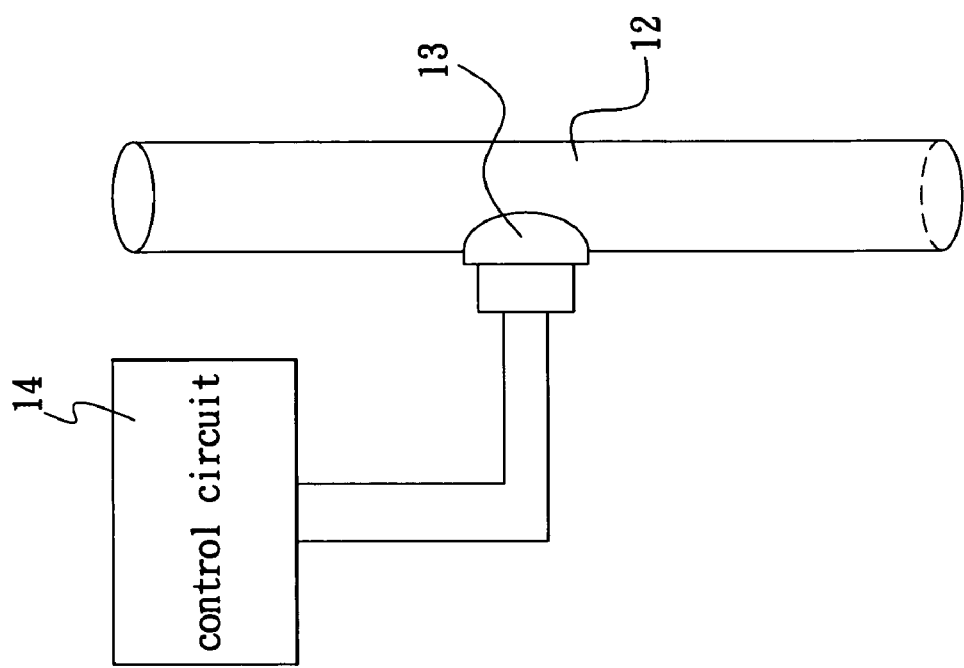
FIG. 1 is a block diagram of the present invention.

Please refer to FIGS. 1 and 2 for the structure for preventing the loss of a pen of an electronic device according to the present invention. A slot 12 disposed on an electronic device such as a personal digital assistant (PDA) or a PDA mobile phone, etc. (not shown in the figure) for accommodating a pen 11. Please refer to FIGS. 2 and 3. The slot 12 has a sensor switch 13, and the sensor switch 13 is electrically connected to a control circuit 14 of the electronic device, such that if the pen 11 is placed into the slot 12, the pen 11 will press on the sensor switch 13 and the sensor switch 13 will send a press signal to the control circuit 14; if the pen is not placed into the slot 12, the sensor switch 13 will not be pressed, and the sensor switch 13 will send a non-press signal to the control circuit 14.

Figure 3:
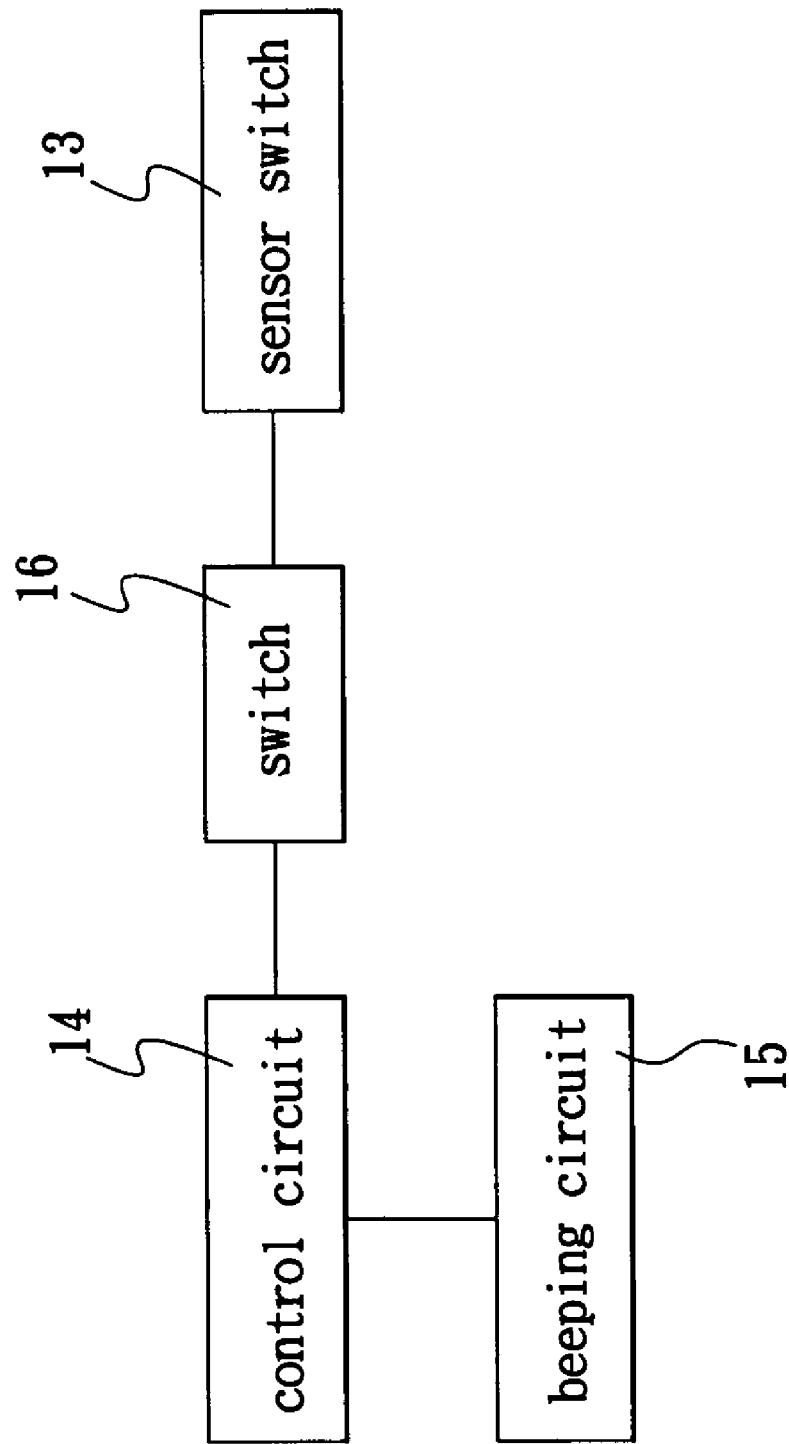
FIG. 3 is a circuit block diagram of the present invention

Please refer to FIGS. 1 and 3. With the foregoing components, if the electronic device is turned off or has not been used for a while, and the sensor switch 13 is not pressed and keeps on sending the non-press signal to the control circuit 14, the control circuit 14 will turn on a beeping circuit 15 to generate a warning sound to remind users to put the pen 11 back into the slot 12. Therefore, the present invention achieves the effect of preventing the loss of the pen 11 by the reminder of such warning sound.

Please refer to FIG. 3 again. In the present invention, a switch 16 is installed between the control circuit 14 of the electronic device and the sensor switch 13, so that if a user presses the switch 16 for an electric connection, the sensor switch 13 is on; if the user presses the switch 16 for an electric disconnection, the sensor switch 13 is off; thereby the user can use the switch 16 to turn on or off the sensor switch 13. When it is necessary to remind the user to place the pen 11 back into the slot 12, the sensor switch 13 is turned on; when it is not necessary to remind the user to place the pen 11 back into the slot 12, the sensor switch 13 is turned off.

Please refer to FIGS. 1 and 2. The sensor switch 13 could be a press button with a spherical surface. With the press button having a spherical surface, it is easy to press the sensor switch 13, when the pen 11 is placed into the slot 12; and it is easy to detach from the sensor switch 13, when the pen 11 is removed from the slot 12.

Please refer to FIG. 3 again. The beeping circuit 15 comprises a music integrated circuit (not shown in the figure) and a speaker (not shown in the figure), wherein the music integrated circuit is connected to the control circuit 14 and the speaker, and the music integrated circuit contains at least one sound or music (such as the song Carmen, a bird sound, or barking, etc) or a voice (such as "Please put your pen back into the slot."), so that when the electronic device is turn off or has not been used for a while, and the sensor switch 13 is not pressed to keep sending the non-press signal to the control circuit 14, the control circuit 14 controls the music integrated circuit to play the digital signals through the speaker and remind the user to put the pen 11 back into the slot 12, and thus preventing the loss of the pen.

While the invention has been described by means of specific embodiments, numerous modifications and variations could be made thereto by those skilled in the art without departing from the scope and spirit of the invention set forth in the claims.

What is claimed is:

1. A structure for preventing loss of a pen for an electronic device, comprising:

a slot, for holding said pen and having a sensor switch therein and said sensor switch being electrically coupled to a control circuit of said electronic device, wherein when said pen is placed into said slot, said pen presses said sensor switch;

a switch disposed between the control circuit of said electronic device and said sensor switch, for selectively turning on or off said sensor switch;

wherein when said sensor switch is turned on by the switch and said pen is placed into said slot, said pen presses said sensor switch and thus said sensor switch sends a press signal to said control circuit;

wherein when said sensor switch is turned on and said pen is not placed into said slot, said sensor switch sends a non-press signal to said control circuit; and wherein when said electronic device is selectively turned off or has not been used for a specific time, and said sensor switch is not pressed by the pen, said control circuit receives said non-press signal from said sensor switch, and when said non-press signal has been received by said control circuit for a specific time, said control circuit turns on a beeping circuit to generate a warning sound to remind users to put said pen back into said slot.

* * * * *